United States Patent
Brock

(10) Patent No.: US 9,625,337 B2
(45) Date of Patent: Apr. 18, 2017

(54) PIEZOELECTRIC TRANSDUCER ASSEMBLY

(71) Applicant: John Brock, Auburn, MI (US)

(72) Inventor: John Brock, Auburn, MI (US)

( * ) Notice: Subject to any disclaimer, the term of this patent is extended or adjusted under 35 U.S.C. 154(b) by 363 days.

(21) Appl. No.: 14/257,320

(22) Filed: Apr. 21, 2014

(65) Prior Publication Data

US 2015/0300899 A1    Oct. 22, 2015

(51) Int. Cl.
    *G01L 9/00* (2006.01)
(52) U.S. Cl.
    CPC .................... *G01L 9/0022* (2013.01)
(58) Field of Classification Search
    CPC .................... H01L 41/0533; H01L 41/053
    USPC .................... 310/338, 344, 348, 355
    See application file for complete search history.

(56) References Cited

U.S. PATENT DOCUMENTS

| | | | | |
|---|---|---|---|---|
| 4,282,588 A * | 8/1981 | Chanson | ................ | E21B 47/12 310/322 |
| 4,802,143 A * | 1/1989 | Smith | ................ | E21B 21/08 175/40 |
| 5,562,096 A * | 10/1996 | Hossack | ................ | A61B 8/12 600/446 |
| 6,450,416 B1 * | 9/2002 | Berg | ................ | B05C 5/0225 239/102.1 |
| 8,286,475 B2 * | 10/2012 | Nakajima | ................ | G01V 1/186 73/152.51 |
| 2002/0178835 A1 * | 12/2002 | Brock | ................ | F04B 43/06 73/861.18 |
| 2003/0010129 A1 * | 1/2003 | Gu | ................ | G01L 9/0055 73/716 |
| 2009/0134240 A1 * | 5/2009 | Gibson | ................ | F02M 51/0603 239/102.2 |
| 2010/0006235 A1 * | 1/2010 | Patrikios | ................ | B06B 3/00 156/580.1 |

* cited by examiner

*Primary Examiner* — Shawki S Ismail
*Assistant Examiner* — Bryan Gordon

(57) ABSTRACT

A piezoelectric transducer assembly having improved impact resistance, stability, and higher quality pulse reproductions. The transducer assembly is not hard wired, but contains a spring contacting a piezoelectric disk with a cup operating as the electrical ground mechanism.

1 Claim, 3 Drawing Sheets

PIEZOELECTRIC TRANSDUCER ASSEMBLY

BACKGROUND OF THE INVENTION

The use of piezoelectric transducers to measure, monitor and track various events is not new in the art. Currently, manufacturers are using magnetic Hall effect transducers, photo optic transducers, Light Emitting Diode transducers and the like to monitor gas pumps, automotive engines, or measure events taking place in manufacturing processes, and the like, where gas pumps are utilized, wherein most pumps in use today are air driven pumps.

Some pressure sensing applications in which piezoelectric transducers have been used are: the actual measurement of pressure; measuring impact forces through the use of accelerometers; use of microphones for recording or detection of sound; the generation of sounds and/or ultrasonic waves; and, the detection of passing automobiles or trains over strings of transducers.

The industry has used electronic feedback from operating pumps in some critical applications for a number of years. The feedback has been carried out in a number of ways. Traditionally, in gas operated pumps, at least one part typically reciprocates. Some pump manufacturers use electronically shifting shuttle valves within or attached to these pumps. Such shifting has been accomplished by a reciprocating portion of the pump being detected with a proximity transducer, or by a color-contrasting portion of a reciprocating part in the pump passing an electronic eye, which in turn sends an electronic signal to a shuttle valve. This movement in turn shifts the shuttle valve.

Other pump manufacturers have used both mechanical and solid-state pressure switches, which receive a blast of gas from valves inside the pump at the desired time of shuttle valve switching. The mechanical or solid-state pressure switch then translates the blast of gas into an electronic signal that is then sent on to the shuttle valve for operation of the shuttle valve. In addition, the electronic signals that are sent to the shuttle valve can and have been tapped by manufacturers to provide electronic signals to other apparati that monitor the pumps. These apparati include but are not limited to: cycle counting transducers, tachometers, overrun monitors, underrun monitors and personal computer systems which are embedded in tools which monitor pumps, among other things.

In every case, the use of such current equipment requires invasive transducer placement in the pump itself. This creates a situation where the parts placed in the interior of the pump cause contamination, or the parts are affected by the caustic, acid, or other destructive chemicals being handled by the pump. Such parts include, fox example, flow meters, mass transducers, and paddle wheel transducers, all of which are placed directly in the flow of the materials being handled by the pump. In the case of foods, such parts create situations wherein the food is contaminated by trace metals and other materials. Also, the placement of these parts in the interior of the pump creates a situation wherein the parts act as plugs or create plugs, or partial plugs, in the flow of the material being handled by the pump, and in addition, these parts are difficult to replace or repair.

In other situations, owing to the above stated problems, pump systems are not monitored at all and this leads to malfunctions in component parts of the manufacturing process and thus also leads to expensive downtime, cleanup and myriad other problems. In these situations, the only time that the pump is monitored is when there is a major malfunction that happens to be noticed by those monitoring the manufacturing process. The ultimate is when these problems cause the pump to stop completely, which often leads to human injury and equipment destruction.

Thus, it would be valuable to have a means of monitoring and/or controlling pumps and investigating automotive engine problems by a non-invasive transducer that would essentially eliminate all of the above-mentioned problems.

Transducers that are capable of monitoring and/or controlling by a non-invasive transducer can be found in U.S. Pat. No. 6,484,589, issued on Nov. 26, 2002; U.S. Pat. No. 6,609,416, issued on Aug. 26, 2003; U.S. Pat. No. 6,823,742 issued on Nov. 30, 2004; U.S. Pat. No. 7,040,149 issued on May 9, 2006, and U.S. Pat. No. 7,096,726 issued on Aug. 29, 2006. All of these deal with transducers that are hard wired and are susceptible to damage. These transducers do not provide the quality or the protection that the transducers of the instant invention do.

THE INVENTION

This invention deals with a new and novel piezoelectric transducer assembly having improved impact resistance, stability, and higher quality pulse reproductions.

Thus, what is disclosed and claimed herein is a piezoelectric transducer assembly comprising an insertable transducer assembly comprising a housing having an upper segment and a lower segment. The upper and lower segments have a common opening running through them.

The upper segment has a top and the top is integrally surmounted by a shaft. The lower segment has a chamfered lower edge, a threaded outside surface, and a bottom surface, wherein the lower segment bottom surface contains a saucer-like depression.

There is a receiving transducer assembly comprising a housing having a top, an inside surface, a bottom and a first opening in the top. The first opening has a predetermined depth and a bottom surface, and the inside surface is threaded. The first opening bottom surface has a centered opening through it, and the opening leads into a recessed area in the bottom of the receiving transducer assembly.

There is located in the first opening in the top, a metal cup. The metal cup has a bottom and there is an opening in the bottom of the cup. There is located in the recessed area, with an end extending into and through the opening in the bottom of the cup, a threaded coaxial connector. The threaded coaxial connector has connected to the extended end, a metal spring. The opposite end of the metal spring extends into the cup, to, and exceeding, the top of the cup.

There is a stabilizer component located in the cup which surrounds the spring. The top of the cup is surmounted by a piezoelectric assembly, wherein the piezoelectric assembly is comprised of a first component which is a conductive metal component centered and layered on a bottom of a piezoelectric element. The piezoelectric element has a structural component overlaid on the top of the piezoelectric component. The structural overlay is surmounted by an O-ring.

DETAILED DESCRIPTION OF THE INVENTION

Figure 1:
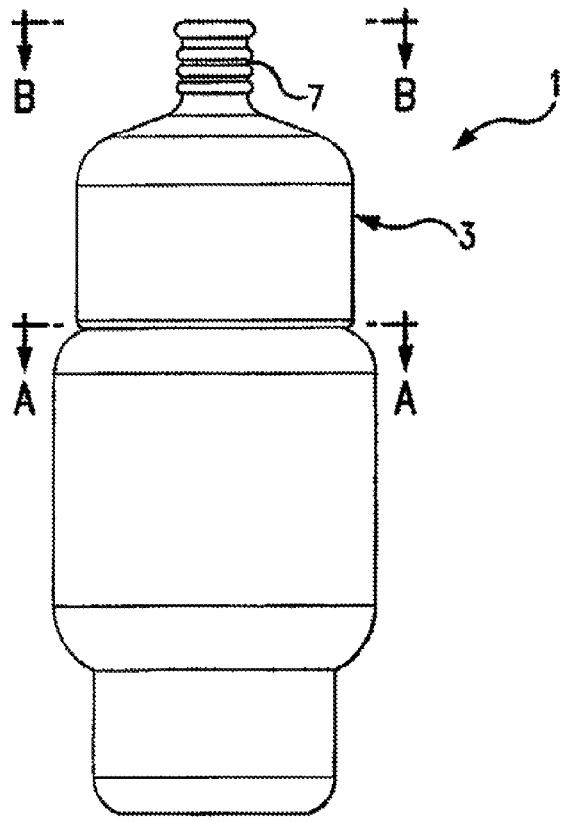
FIG. 1 is full side view of a device 1 of this invention.
Figure 17:
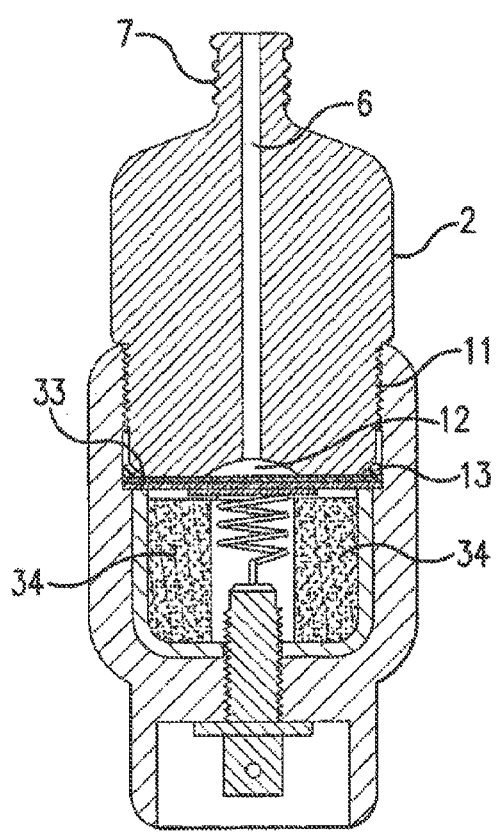
FIG. 17 is a full cross sectional side view taken through line B-B of FIG. 1.

Turning now to the Figures, and especially FIG. 1, there is shown a device 1 of this invention. FIG. 17 shows a full side view of the device 1 in cross section through line B-B of FIG. 1.

Figure 2:
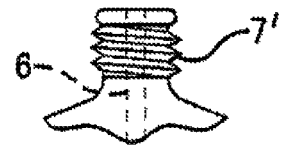
FIG. 2 is a full side view of an alternative threaded shaft for the device 1.
Figure 3:
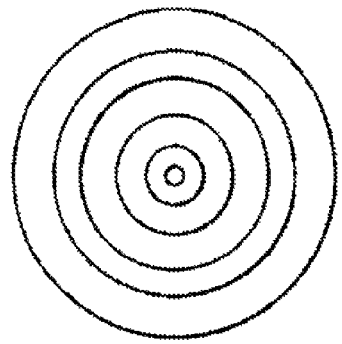
FIG. 3 is a full bottom end view of the device 1 of this invention.
Figure 4:
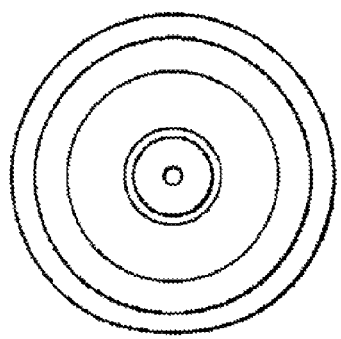
FIG. 4 is a full top end view of the device 1 of this invention.
Figure 5:
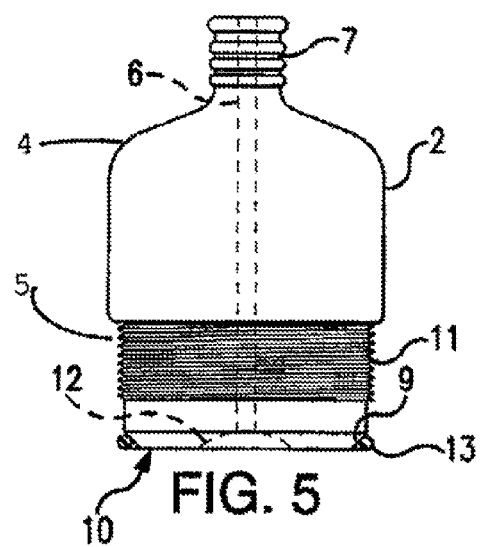
FIG. 5 is a view of the upper assembly of a device 1 of this invention.
Figure 6:
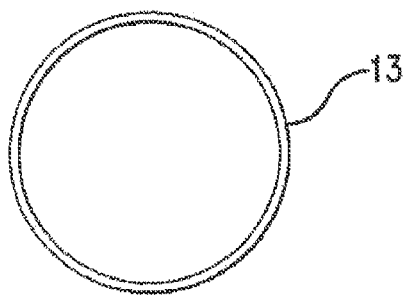
FIG. 6 is a top view of an O-ring useful in this invention.
Figure 7:
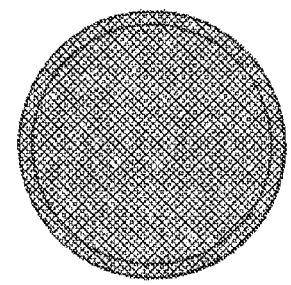
FIG. 7 is a top view of a piezoelectric disk of this invention with the structural overlay.
Figure 8:
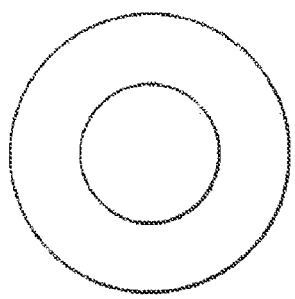
FIG. 8 is a bottom view of the piezoelectric disk of this invention showing the conductive metal overlay.
Figure 9:
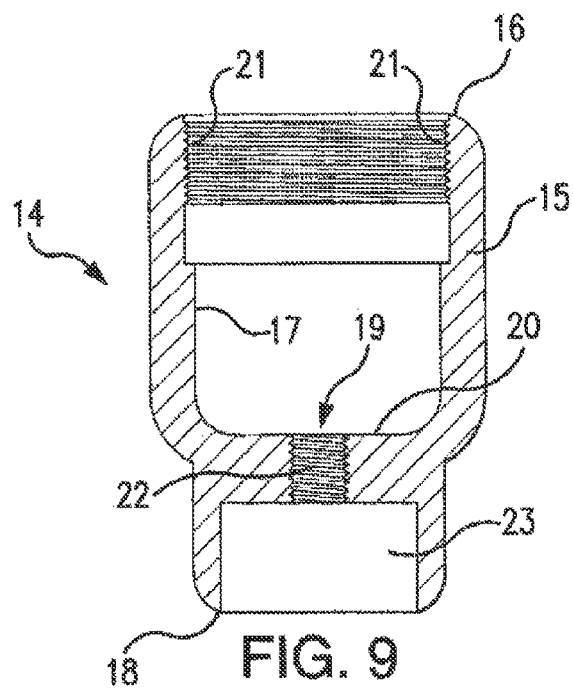
FIG. 9 is a cross sectional full side view of the lower housing of this invention through line A-A of FIG. 1.
Figure 10:
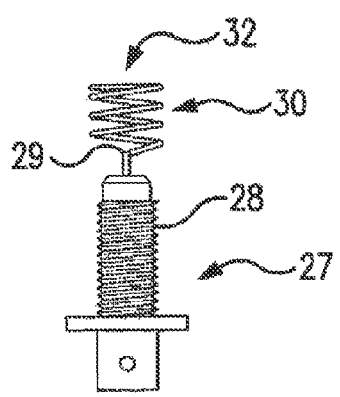
FIG. 10 is a full side view of a coaxial connector with a spring attached.
Figure 11:
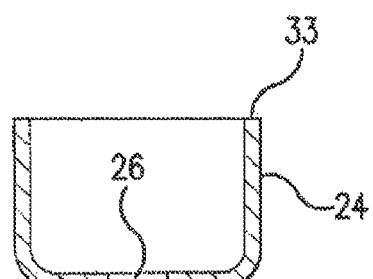
FIG. 11 is a cross sectional full side view of a grounding cup of the inventive device through line A-A of FIG. 1.
Figure 12:
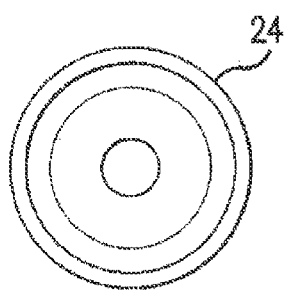
FIG. 12 is a full top view of the cup of FIG. 11.
Figure 13:
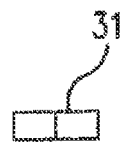
FIG. 13 is a full side view of a nut used with the coaxial connector of FIG. 10.
Figure 14:
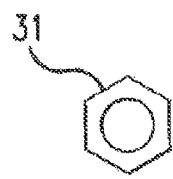
FIG. 14 is a full top view of the nut of FIG. 13.

There is shown an insertable transducer assembly 3 having a housing 2 having an upper segment 4 and a lower segment 5. The upper segment 4 and the lower segment 5 have a common opening 6 through them (see FIG. 5 showing the opening 6 in phantom, and FIG. 17, showing the opening). The upper segment 4 has a shaft 7 extending from the top surface 8 and this shaft 7 is the means by which the pulsed air reaches the interior of the housing 2. The shaft 7 is shown as a ribbed shaft for use with hoses and the like. FIG. 2 illustrates a threaded shaft 7' for use with threaded attachments.

The lower segment 5 has a chamfered edge 9 at the bottom surface 10, a threaded outside surface 11, and a saucer-like depression 12 in the bottom surface 10. There is also shown an O-ring 13 interfacing with the chamfered edge 9.

The insertable transducer assembly is manufactured from plastics and preferred are polyethylene, crosslinked polyethylene, and polypropylene. Most preferred is polypropylene.

There is a receiving transducer assembly 14 having a housing 15 in which the housing 15 has a top 16, an inside surface 17, a bottom 18, and a first opening 19 in the top 16. The first opening 19 has a predetermined depth and a bottom surface 20. The inside surface 17 is threaded 21. The first opening bottom surface 20 has a threaded, centered opening 22 in it and this opening 22 leads into a recessed area 23 in the bottom 18 of the receiving transducer assembly 14.

There is located in the first opening 19 in the top 16, a metal cup 24. This metal cup 24 acts as the ground lead for the assembly 1. The cup 24 has a bottom 25 and there is an opening 26 in the bottom 25 for the insertion of a threaded coaxial connector 27 to be described infra.

Located in the recessed area 23 is the threaded coaxial connector 27. The threaded coaxial connector 27 has a threaded end 28 that threads into the opening 22 and extends into the cup 24. This end 29 of the coaxial connector 27 has an electrical conductive metal spring 30 attached to it. Once the threaded coaxial connector 27 is inserted into the opening 22 and into the cup 24, and tightened against an interior nut 31, the tip 32 of the spring 30 extends just beyond the top edge 33 of the cup 24. In this manner, when the assembly 1 is put together, the spring 30 is compressed slightly.

The receivable transducer assembly is manufactured from plastics and preferred are polyethylene, crosslinked polyethylene, and polypropylene. Most preferred is polypropylene.

Figure 15:
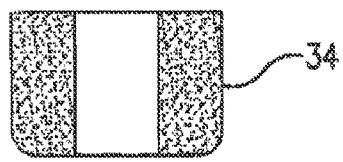
FIG. 15 is a cross sectional full side view of a stabilizer insert used in this invention.
Figure 16:
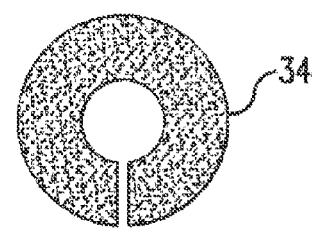
FIG. 16 is a full top view of the stabilizer insert of FIG. 15.

There is a stabilizer component 34 that surrounds the spring 30. This stabilizer component can be manufactured from any soft pliable material such as cardboard, paper, cotton or material/fabric, or foamed material. Preferred for this invention is foam. FIGS. 15 and 16 illustrate the stabilizer component 34.

Figure 18:
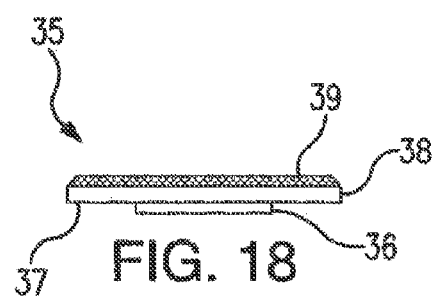
FIG. 18 is an edge view of the piezoelectric assembly used in this invention.

The top edge 33 of the cup 24 is surmounted by a piezoelectric assembly 35 (FIG. 18). The piezoelectric assembly 35 comprises a first component which is a conductive metal component 36 which is centered and layered on the bottom 37 of a piezoelectric element 38. The piezoelectric element 38 has a structural overlay 39 on the top 40. The structural overlay 39 is surmounted by an O-ring.

The conductive metal component 38 is formed of any metal that will conduct electricity. Preferred is copper metal. The structural overlay 39 stabilizes the piezoelectric element 38 from over bending when pulses arrive through the opening 5 and impact on the piezoelectric element 38. Such materials can be thin tapes having fiber filling, or the like.

It is contemplated within the scope of this invention to optionally use an O-ring between the insertable transducer assembly and the receiving transducer assembly.

What is claimed is:
1. A piezoelectric transducer assembly comprising:
   a. an insertable transducer assembly comprising a housing having an upper segment and a lower segment; said upper and lower segments having a common opening therethrough;
   b. said upper segment having a top and said top being integrally surmounted by a shaft;
   c. said lower segment having a chamfered lower edge, a threaded outside surface, and a bottom surface, said lower segment bottom surface containing a saucer-like depression;
   d. a receiving transducer assembly comprising a housing having a top, inside surface, a bottom and a first opening in said top, said first opening having a predetermined depth and a bottom surface, said inside surface being threaded;
   e. said first opening bottom surface having a threaded centered opening therethrough, said threaded, centered opening leading into a recessed area in said bottom of said receiving transducer assembly;
   f. there being located in said first opening in said top, a metal cup, having a bottom, said cup having an opening in said bottom
   g. there being located in said recessed area with an end extending into and through said opening in said bottom of said cup, a threaded coaxial connector, said threaded coaxial connector having connected to said extended end, a metal spring, the opposite end of said metal spring extending into said cup, to, and exceeding, said top of said cup;
h. there being a stabilizer component located in said cup and surrounding said spring;
i. said top of said cup being surmounted by a piezoelectric assembly, said piezoelectric assembly comprising a first component which is a conductive metal component, centered and layered on a bottom of a piezoelectric element, said piezoelectric element having a structural component overlaid on a top thereof;
j. said structural overlay being surmounted by an O-ring.

\* \* \* \* \*